United States Patent [19]

Seamans et al.

[11] Patent Number: 5,041,404

[45] Date of Patent: * Aug. 20, 1991

[54] METHOD OF PRESULFIDING A HYDROTREATING, HYDROCRACKING OR TAIL GAS TREATING CATALYST

[75] Inventors: James D. Seamans, Reisterstown; James G. Welch, Baltimore; Neal G. Gasser, Mt. Airy, all of Md.; Charles T. Adams, Houston, Tex.

[73] Assignee: CRI Ventures, Inc., Baltimore, Md.

[ * ] Notice: The portion of the term of this patent subsequent to Jul. 27, 2007 has been disclaimed.

[21] Appl. No.: 492,762

[22] Filed: Mar. 13, 1990

Related U.S. Application Data

[63] Continuation-in-part of Ser. No. 243,687, Sep. 13, 1988, Pat. No. 4,943,547.

[51] Int. Cl.$^5$ .............. B01J 27/051; B01J 27/049; B01J 27/047; K10G 45/08
[52] U.S. Cl. .............. 502/150; 208/108; 208/216 R; 502/219; 502/220; 502/221
[58] Field of Search .............. 502/219, 220, 221, 150

[56] References Cited

U.S. PATENT DOCUMENTS

| | | | |
|---|---|---|---|
| 2,038,599 | 4/1936 | Pier et al. | 146/53 |
| 2,232,909 | 2/1941 | Gohr | 502/220 |
| 2,402,683 | 6/1946 | Signaigo | 502/221 |
| 3,383,301 | 5/1968 | Beuther et al. | 268/216 |
| 3,898,183 | 8/1975 | Sugier et al. | 423/212 |
| 4,089,930 | 5/1978 | Kittrell et al. | 423/239 |
| 4,177,136 | 12/1979 | Herrington et al. | 208/215 |
| 4,368,141 | 1/1983 | Kukes | 585/371 |
| 4,525,472 | 6/1985 | Morales et al. | 502/306 |
| 4,530,917 | 7/1985 | Berrebi | 502/226 |
| 4,548,920 | 10/1985 | Thompson et al. | 502/219 |
| 4,588,709 | 5/1986 | Morales et al. | 502/314 |
| 4,698,145 | 10/1987 | Ho et al. | 208/18 |
| 4,719,195 | 1/1988 | Toulhoat et al. | 502/216 |
| 4,721,558 | 1/1988 | Jacobson et al. | 208/108 |
| 4,725,569 | 2/1988 | Tuszynski et al. | 502/168 |
| 4,725,571 | 2/1988 | Tuszynski et al. | 502/220 |
| 4,857,496 | 8/1989 | Lopez et al. | 508/220 |
| 4,943,547 | 7/1990 | Seamans et al. | 502/150 |

FOREIGN PATENT DOCUMENTS

| | | |
|---|---|---|
| 759938 | 5/1967 | Canada . |
| 1220188 | 11/1983 | Canada . |
| 7703594 | 10/1977 | Netherlands ............ 502/220 |
| 701699 | 5/1977 | U.S.S.R. . |

OTHER PUBLICATIONS

"Experience Reveals Best Presulfiding Techniques for HDSA or HDN Catalysts", Harman Vallie, Oil & Gas Journal, 12/20/82, pp. 69–74.

Primary Examiner—Paul E. Konopka
Attorney, Agent, or Firm—Oliff & Berridge

[57] ABSTRACT

An improved method of presulfiding a hydrotreating or hydrocracking catalyst which minimizes sulfur stripping upon start-up of a hydrotreating or hydrocracking reactor utilizing such a catalyst. The method comprises the steps of contacting a hydrotreating or hydrocracking catalyst with elemental sulfur at a temperature below the melting point of sulfur, thereby forming a sulfur-catalyst mixture, and heating the sulfur-catalyst mixture to a temperature above the melting point of sulfur. Preferably, the sulfur-catalyst mixture is first mixed with at least one member selected from the group consisting of high boiling oils and hydrocarbon solvents to form a prewet mixture prior to heating at a temperature above the melting point of sulfur. Tail gas treating catalysts are also presulfided by these methods.

23 Claims, No Drawings

METHOD OF PRESULFIDING A HYDROTREATING, HYDROCRACKING OR TAIL GAS TREATING CATALYST

CROSS REFERENCE TO RELATED APPLICATION

This application is a continuation-in-part of U.S. patent application Ser. No. 07/243,687 filed Sept. 13, 1988, now U.S. Pat. No. 4,943,547.

FIELD OF THE INVENTION

This invention relates to a method of presulfiding a supported metal oxide catalyst for use in hydrotreating and/or hydrocracking hydrocarbon feed stocks. This invention further relates to a method of presulfiding a tail gas catalyst for use in treating effluent gas streams.

BACKGROUND OF THE INVENTION

A hydrotreating catalyst may be defined as any catalyst composition which may be employed to catalyze the hydrogenation of hydrocarbon feedstocks. A hydrocracking catalyst may be defined as any catalyst composition which may be employed to catalyze the addition of hydrogen to /massive and complex petroleum derived molecules and the cracking of the molecules to attain smaller molecules. A tail gas catalyst may be defined as any catalyst which may be employed to catalyze the conversion of hazardous effluent gas streams to less harmful products. Such catalyst compositions are well known to those of ordinary skill in the art and several are commercially available. Metal oxide catalysts which come within these definitions include cobalt-molybdenum, nickel-tungsten, and nickel-molybdenum. Also, transition element catalysts may be employed for these purposes. Typical supports for hydrotreating metal oxide catalysts include alumina, silica and silica-alumina supports.

In the past, ex-situ methods of presulfiding supported metal oxide catalysts have suffered from excessive stripping of sulfur upon start-up of a hydrotreating or hydrocracking reactor. As a result of sulfur stripping, an increase in the product weight percent of sulfur is observed along with a decrease in catalyst activity.

The use of high boiling oils, hydrocarbon solvents and mixtures thereof to aid the incorporation of sulfur into a catalyst is not believed to have been previously taught by prior presulfiding methods. Hereforth, a high boiling oil is defined as an oil whose initial boiling point is greater than 400° F.

Hydrotreating and hydrocracking catalysts are typically presulfided by incorporating sulfur compounds into the porous catalyst prior to hydrotreating or hydrocracking a hydrocarbon feedstock. For example, U.S. Pat. No. 4,530,917 to Berrebi discloses a method of presulfiding a hydrotreating catalyst with organic polysulfides.

U.S. Pat. No. 4,177,136 to Herrington et al. discloses a method of catalyst presulfiding wherein a catalyst is treated with elemental sulfur. Hydrogen is then used as a reducing agent to convert the elemental sulfur to $H_2S$ in situ. Problems arise, however, upon start-up of a reactor due to excessive sulfur stripping.

U.S. Pat. No. 4,089,930 to Kittrell et al. discloses the pretreatment of a catalyst with elemental sulfur in the presence of hydrogen.

SUMMARY OF THE INVENTION

It is an object of the present invention to presulfide a hydrotreating, hydrocracking or tail gas treating catalyst in a manner which minimizes sulfur strippinq upon start-up of a hydrotreating, hydrocracking or tail gas treating reactor.

It is yet a further object of the present invention to activate spent catalyst in such a manner as to minimize the amount of sulfur required for activation.

It is yet a further object of the present invention to prepare a safe, stable, presulfided hydrotreating, hydrocracking or tail gas treating catalyst.

It is yet a further object of the present invention to prepare a safe, stable, presulfided regenerated hydrotreating, hydrocracking or tail gas treating catalyst.

It is yet a further object of the present invention to provide a technique for activating a presulfided hydrotreating, hydrocracking or tail gas treating catalyst in-situ.

The present invention relates to an improved method of presulfiding a hydrotreating, hydrocracking or tail gas treating catalyst which minimizes sulfur stripping upon start-up of a hydrotreating, hydrocracking or tail gas treating reactor and improves catalyst activity. The catalyst is preferably presulfided by one of two methods. The first method comprises the steps of (a) contacting the supported metal oxide catalyst with powdered elemental sulfur, to form a mixture, at a temperature below the melting point of sulfur, (b) contacting the resultant mixture with at least one member selected from the group consisting of high boiling oils and hydrocarbon solvents in a hydrogen-free environment, and (c) heating said mixture to a temperature above the melting point of sulfur.

The second method comprises the steps of (a) preparing a mixture of elemental sulfur and at least one member selected from the group consisting of high boiling oils and hydrocarbon solvents at a temperature below the melting point of sulfur, (b) contacting the supported metal oxide catalyst with the mixture to form a resultant catalyst mixture, and (c) heating the resultant catalyst mixture to a temperature above the melting point of sulfur.

Alternatively, the catalyst is mixed with elemental sulfur at a temperature below the melting point of sulfur and then heated, in the absence of oil and hydrocarbon solvents, to a temperature above the melting point of sulfur but below temperatures where activity loss is observed.

DESCRIPTION OF THE PREFERRED EMBODIMENTS

Several techniques may be employed to contact sulfur with catalyst particles. The use of solid sulfur eliminates many hazards such as flammability and toxicity, which are encountered when using $H_2S$, liquid sulfides, polysulfides and/or mercaptans. Powdered sulfur may be physically mixed with the catalyst particles prior to loading the catalyst particles in a reactor. The elemental sulfur and the catalyst particles may be mixed together at a temperature below the melting point of sulfur, preferably in the range of from 180° F. to 210° F. In this temperature range, the elemental sulfur sublimes and is incorporated into the pores of the catalyst particles where, upon cooling, it condenses. By using the sublimed form of sulfur a uniform coating on the surfaces of the catalyst pores is achieved. The instant invention provides a presulfided catalyst having a higher efficiency of hydrodesulfurization than catalysts presulfided with molten sulfur. Incorporation deep into the catalyst pores is also more easily achieved with sublimed sulfur than with molten sulfur. The sulfur-catalyst mixture is then heated to a temperature above the melting point of sulfur preferably in the range of from 250° F. to 390° F. In the presence of hydrogen, activation of the catalyst takes place. That is, the metal oxides react with substantially all of the sulfur incorporated into the catalyst pores, thus producing $H_2S$ and metal sulfides.

Mixing times for the powdered elemental sulfur and the catalyst can be minimized by heating the mixture at higher temperatures, within specified limitations, due to the increased vapor pressure of the sulfur. Typically, the amount of sulfur employed is stoichiometric relative to the catalytic metals content of the catalyst charged. Mixing times of the powdered sulfur and the catalyst particles may be minimized due to the reduced stoichiometric amount of sulfur. While the use of greater amounts of sulfur does result in more sulfur being incorporated into the pores of the catalyst, the amount of sulfur stripping during reactor start-up is much greater than that of a stoichiometric charge depending on the composition of the catalyst. Amounts slightly less than stoichiometric also provide significant advantages over non-presulfided catalysts. Also, when a stoichiometric amount of sulfur is employed, a minimum stripping effect is observed upon reactor start-up.

Stoichiometric amounts of sulfur used for the presulfiding are calculated based on the metal content of the catalyst used. For example, a catalyst containing cobalt would require 8 molecules of sulfur to react with 9 molecules of cobalt to form a preferred cobalt sulfide of the formula $Co_9S_8$. By multiplying the molecular weight of cobalt by 9 and dividing into 8 times the molecular weight of sulfur, a ratio of 0.48 is calculated which, when multiplied by the weight percentage of cobalt in the catalyst, provides the optimum weight % of sulfur necessary to react with the available cobalt. Likewise, the amount of sulfur required to convert molybdenum in a catalyst to $MoS_2$ is calculated by multiplying the weight % of molebdenum by 0.67. For the conversion of nickel to $Ni_3S_2$, the weight % of nickel is multiplied by 0.36. For the conversion of tungsten to $WS_2$, the weight percentage of tungsten is multiplied by 0.35.

For a catalyst containing 2.4% Co and 9.8% Mo the stoichiometric amount of sulfur required is calculated as:

2.4%×0.48+9.8%×0.67=7.7% or 7.7 lbs. of sulfur per 100 lbs. of catalyst.

In another example, a catalyst containing 3.0% Ni and 13.0% Mo would require a stoichiometric amount of sulfur calculated as:

3.0%×0.36+13.0%×0.67=9.8% or 9.8 lbs. of sulfur per 100 lbs. of catalyst.

Target sulfur loading ranges are calculated as being from 1.5% higher than stoichiometric to 1.5% below stoichiometric, said percentage being based on the total weight of the catalyst. Thus, for the catalyst containing 2.4% Co and 9.8% Mo, stoichiometric sulfur is 7.7% and the target range is from 6.2% to 9.2%.

On regenerated catalysts, the level of sulfur on the catalyst prior to presulfiding needs to be measured and subtracted from the desired final sulfur level to determine the target level and target range. In this way, residual sulfur remaining after regeneration is not included as "presulfiding" sulfur.

A significant aspect of the present invention is that improved results are obtained when catalyst presulfiding is accomplished by mixing the catalyst particles with powdered elemental sulfur and sequentially or simultaneously contacting the sulfur-catalyst mixture with at least one selected from the group consisting of high boiling oils and hydrocarbon solvents and heating to a temperature above the melting point of sulfur. Hereforth, this step will be referred to as prewetting. Subsequent activity tests on catalysts produced using such a technique have shown excellent results.

Various high boiling oils, hydrocarbon solvents and mixtures may be used as prewetting agents according to the claimed invention. Good results have been achieved when using oils with boiling ranges from approximately 700° F. to 1000° F. In particular, vacuum gas oils with low sulfur contents have been shown to be successful.

If the prewetting step is independent of mixing the powdered sulfur with the catalyst, it may be performed in-situ or off-site of the reactor. If prewetted in-situ, the feedstock used in the reactor can be used as the prewetting oil, minimizing costs for the refinery.

According to one embodiment of the present invention, catalyst particles are sequentially contacted with first, elemental sulfur, and then with at least one member selected from the group consisting of high boiling oils and hydrocarbon solvents. The catalyst particles are contacted with the powdered elemental sulfur at a temperature below the melting point of sulfur and preferably in the range of from 180° F. to 210° F. The catalyst and the sulfur are then mixed for a sufficient amount of time to allow incorporation of the sulfur into the catalyst pores. A catalyst-sulfur mixture is thus produced. To this mixture is added a prewetting agent comprising at least one member selected from the group consisting of high boiling oils and hydrocarbon solvents thus producing a prewet mixture. The prewet mixture is preferably further heated to a temperature above the melting point of sulfur. Most preferably, to a temperature in the range of 250° F. to 450° F. The presulfided prewet catalyst so prepared may be conveniently activated by heating in the presence of hydrogen.

In another embodiment according to the present invention, the catalyst particles are contacted with both the powdered elemental sulfur and a prewetting agent comprising at least one member selected from the group consisting of high boiling oils and hydrocarbon solvents simultaneously. According to this method, a mixture of elemental sulfur and a prewetting agent is first produced. A ratio of approximately 4:1 prewetting agent to sulfur by weight is preferred. This ratio provides sufficient sulfur to fully sulfide the catalyst with a minimum of liquid carrier which keeps weight and thus shipping costs to a minimum. The mixture is then heated to approximately 100° F. to promote homogenous mixing of the components. Toluene, other light weight hydrocarbon solvents and paraffins may be added to decrease the viscosity of the mixture which facilitates the incorporation of sulfur in the catalyst. Light weight paraffins are preferred and are hereby defined as those paraffins having 16 or less carbon atoms. Also, increased heat will achieve the same effect. The mixture is then added to a preweighed catalyst sample and mixed.

In a preferred embodiment, catalyst particles prewet by the simultaneous method described above are further heat treated at a temperature in the range of from 250° F. to 450° F. under a nitrogen atmosphere or other inert atmosphere.

Results of activity tests have shown that mixing the sulfur-catalyst particles with a high boiling oil, hydrocarbon solvent or mixture as described above in an inert environment and heating to a temperature above the melting point of sulfur most significantly minimizes sulfur stripping upon reactor start-up. The elemental sulfur by itself was found to indeed presulfide the catalyst metals with only oil and hydrogen present and no other form of sulfur required. Alternatively, the catalyst may be activated with hydrogen at a later step, independent of mixing with a prewetting fluid.

A versatile hydrotreating or hydrocracking catalyst which shows good activity under various reactor conditions is a nickel-molybsten catalyst. Cobalt-molybdenum and nickel-tungsten catalysts are also preferred although many other metal oxide catalysts and transition element catalysts may be presulfided according to the claimed invention. These include catalysts comprising at least one element selected from the group consisting of V, Cr, Mn, Fe, Co, Ni, Cu, Zn, Mo, W, Rh, Pd, Pt, Ag, Au, Cd, Sn, Sb, Bi and Te.

The processes of the present invention are further applicable to the sulfiding of spent catalysts which have been regenerated. After a conventional regeneration process, a regenerated catalyst may be presulfided as would fresh catalyst in the manner set forth above and specifically in a manner set forth by way of the following examples.

EXAMPLES

The following Examples further illustrate the practice and advantages of specific embodiments of the claimed invention. These Examples are illustrative only; in no event are they to be considered as limiting the scope of the claimed invention.

EXAMPLE I

Standard Method

A sample of a Nickel-Molybdenum catalyst was dried at 700° F. for one hour and then cooled to ambient under vacuum. The sample was then placed in a flask and enough elemental sulfur was added to produce a sulfur level of 6%. The flask was then sealed and placed in a 231° F. oven for one hour. During this time period, the flask was rotated continually to provide uniform distribution of sulfur. The final sulfur level was 6% sulfur.

Example IIA

Standard Method and Simultaneous Prewet

A sample of a Nickel-Molybdenum catalyst was dried at 700° F. for one hour and then cooled to ambient under vacuum.

Into a beaker the following were added:
1. 60.89 grams of a Vacuum Gas Oil Feedstock;
2. 14.10 grams of Elemental Sulfur.

The mixture was heated to 102° F. and mixed. The mixture was removed from the heat and 15.51 grams of toluene were added and mixed.

To a preweighed catalyst sample (159.6 grams), 72.02 grams of the above mixture were added. The container was then sealed and mixed by shaking. The container was reopened and placed under vacuum for 16 hours to gently remove the majority of the toluene. The final sulfur level was 4.5% sulfur.

Example IIB

Standard Method and Sequential Prewet

A sample of a Nickel-Molybdenum catalyst was dried at 700° F. for one hour and then cooled to ambient under vacuum. The sample was then placed in a flask and enough elemental sulfur was added to produce a sulfur level of 6.6%. The flask was then sealed and placed in a 231° F. oven for one hour. During this time period, the flask was rotated continually to provide uniform distribution of sulfur.

Into a beaker the following were added:
1) 35.01 grams of a vacuum gas oil feedstock
2) 8.92 grams of toluene The contents of the mixture were then mixed.

To a preweighed sample of the above sulfur-impregnated catalyst (42.72 grams), 15.28 grams of the prepared oil-toluene mixture were added. The container was then sealed and mixed by shaking. The container was reopened and placed under vacuum for hours to gently remove the majority of the toluene. The final sulfur level was 5.5% sulfur.

Example III

Standard Method, Simultaneous Prewet and Heat

The catalyst prepared in Example IIA was heat treated at 392° F. for one hour under a nitrogen blanket. The sample was also cooled under a nitrogen blanket. The final sulfur level was 4.9%. It is expected that the Standard Method, Sequential Prewet and Heat would produce comparable results.

Activity tests were conducted on catalysts prepared according to Examples I–III. Oxide catalysts which were not presulfided were also tested as controls for each start-up procedure.

Three start-up procedures were used in testing the activity of each presulfided catalyst.

| Fast Oil Start-Up | |
|---|---|
| Catalyst Charge: | 48 cc + diluent |
| Reactor Pressure: | 700 psig |
| $H_2$ Flow Rate: | 1000 SCF/Bbl |
| Liquid Feed: | Diesel Fuel |
| Sulfur = | 0.17 wt. % |
| | 31.1° API |
| LHSV = | 1.5 hr$^{-1}$ |
| | (approx. 63 gms/hr.) |

The hydrogen feed rate and reactor pressure are established at ambient temperature. The liquid feed is introduced and the reactor temperature is increased to 250° F. during the first hour on stream. The reactor temperature is then increased at a rate of about 45° F./hour to 650° F. The reactor is then allowed to cool to 475° F. during the next two hours. Once the reactor is at 475° F., the diesel is discontinued and the standard 1.8 wt. % sulfur gas oil feedstock is started. Standard run conditions, heating rate, etc. followed. The standard gas oil feedstock consists of ⅔ vacuum gas oil and ⅓ light cycle oil. The API gravity is 21.6°, the weight percent Sulfur is 1.8% and the Total Nitrogen content is 880 ppm. Standard run conditions are:

| | |
|---|---|
| Reactor Temperature: | 625° F. |

| | |
|---|---|
| Reactor Pressure: | 700 psig |
| LHSV: | 1.5 hr$^{-1}$ |
| H$_2$ Flow Rate: | 1000 SCF/Bbl |
| Slow Oil Start-Up | |
| Catalyst Charge: | 48 cc + diluent |
| Reactor Pressure: | 700 psig |
| H2 Flow Rate: | 1000 SCF/Bbl |
| Liquid Feed: | 62 gms./hr of Diesel Oil |
| LHSV = | 1.5 hr$^{-1}$ |
| | (approx. 62 gms/hr.) |

The reactor pressure, hydrogen flow rate and liquid feed rate are established at ambient temperature. The reactor temperature was increased at a rate of 24° F./hour to 650° F. When the reactor temperature reached 650° F., the heat was cut off and the temperature was reduced to 475° F. Immediately following the cut off of heat, the diesel oil was drained from the feed tank and the standard 1.8 wt. % sulfur feedstock was charged. Standard run conditions, heating rate, etc. followed.

| Hydrogen Start-Up Feed in at 550° F. ||
|---|---|
| Catalyst Charge: | 48 cc + diluent |
| Reactor Pressure: | 700 psig |
| H$_2$ Flow Rate: | 0.467 SCFH |
| Liquid Feed: | 0.0 gms/hr |

The reactor was heated at a rate of 50° F./hr until a temperature of 625° F. was reached. During this heat up period, liquid feed was introduced when the reactor temperature reached 550° F. at a feed rate of 65 gms/hr.

In certain start-up situations, the standard method presulfided catalysts have difficulties. With the slow diesel start-up, excessive sulfur is displaced from the catalyst resulting in less activity. With the hydrogen to 550° F. start-up, the standard method presulfided catalysts yield poor results because of the exposure to hydrogen at high temperature without a hydrocarbon present. The modified procedures of the simultaneous and sequential prewet methods with and without heat overcome these difficulties by producing a catalyst that can tolerate a wide range of conceivable start-up procedures.

The results presented below are for the three different types of start-up procedures. The test results verify that the use of vacuum gas oil and heat most greatly reduce the weight percent of sulfur in the product. The percent efficiency is calculated by subtracting the final product level from the initial level in the feedstock, dividing the difference by the initial level and multiplying by one hundred percent.

| | Product Sulfur w % | Product Total Nitrogen ppm | percent efficiency hydrodesulfurization | percent efficiency hydrodenitrogenation |
|---|---|---|---|---|
| Fast Oil Start-Up | | | | |
| Oxide catalyst | 0.68–0.69 | 640–660 | 62 | 27–25 |
| Example 1 | 0.54–0.58 | 560–600 | 70–68 | 36–32 |
| Slow Oil Start-Up | | | | |
| Oxide catalyst | 0.68–0.69 | 640–660 | 62 | 27–25 |
| Example I | 0.67 | 633 | 63 | 28 |
| Example IIA | 0.61 | 616 | 66 | 30 |
| Example IIB | 0.61 | 610 | 66 | 31 |
| Example III | 0.57 | 585 | 68 | 34 |
| Hydrogen Start-Up (Feed in at 550° F.) | | | | |
| Oxide catalyst | 0.65 | 625 | 64 | 29 |
| Example I | 0.71–0.84 | 620–700 | 61–53 | 30–20 |
| Example IIA | 0.58 | 595 | 68 | 32 |
| Example IIB | 0.60–0.63 | 580–600 | 67–65 | 34–32 |
| Example III | 0.57 | 550 | 68 | 38 |

Two comparative activity tests were conducted on catalysts sulfided according to methods similar to those disclosed in U.S. Pat. No. 4,177,136 to Herrington et al. which use molten sulfur. According to one method, an in-situ melt sample was prepared, and according to another method, an ex-situ melt sample was prepared. Following the catalyst preparations, fast oil start-ups and standard activity tests were employed to permit comparison of results with oxide and Example I catalysts. A nickel-molybdenum trilobe catalyst of 1/16 inch diameter was charged with a stoichiometrically calculated amount of sulfur. A multiple bed reactor was used and charged as follows.

Stoichiometric Sulfur = 9.76%
Total Catalyst Charge Wt. = 36.96 grams
Total Sulfur Wt. Needed = 4.00 grams
Top Bed: 3.08 gms. Cat. + 1.67 gms. S°
(Sulfur is melted at 130° C. first)
Top Middle Bed: 4.31 gms. Cat. + 2.33 gms. S°
(sulfur is melted at 130° C. first)
Bed charge weights for the ex-situ melt sample:

| | CATALYST | DILUENT | SULFUR | TOTAL |
|---|---|---|---|---|
| TOP | 3.08 gms. | 52.00 gms. | 1.67 gms. | 56.75 gms. |
| TOP MID | 4.31 gms. | 7.28 gms. | 2.33 gms. | 13.92 gms. |
| BOTTOM MID | 12.63 gms. | 21.32 gms. | — | 33.95 gms. |
| BOTTOM | 16.94 gms. | 28.60 gms. | — | 45.54 gms. |

Bed charge weights for the in-situ melt sample:

| | CATALYST | DILUENT | SULFUR | TOTAL |
|---|---|---|---|---|
| TOP | 3.08 gms. | 52.00 gms. | 4.00 gms. | 59.08 gms. |
| MIDDLE | 16.94 gms. | 28.60 gms. | — | 45.54 gms. |
| BOTTOM | 16.94 gms. | 28.60 gms. | — | 45.54 gms. |

The start-up was as follows:
1. Load in-situ Melt Sample in reactor A
2. Purge Reactor with Nitrogen
3. Heat to 248° F. to melt the sulfur
4. Hold for 30 minutes. Cut the heat.
5. Cool to ambient.
6. Charge the ex-situ Melt Sample to reactor B and send both samples through the following heating program.
7. Reactor at ambient pressure with a hydrogen flow of 220 sccm.
8. Heat up to 700° F. as fast as possible (2 hrs.)
9. Hold at 700° F. for 1 hour.
10. Cut the hydrogen flow off and block in with no pressure. Both samples will remain under a hydrogen atmosphere.
11. Cool to ambient 12. Follow with a standard fast oil start-up Ambient—257° F. in 1 hour 45° F./hr. to 650° F. Change out diesel feed to standard gas oil feedstock 13. Cool to 475° F. and follow with standard activity test The percent efficiency of hydrodesulfurization was 65% for both molten samples.

The present invention has been described in some detail, including alternative embodiments thereof. It will be appreciated, however, that those skilled in the art, upon consideration of the present disclosure, may make modifications and improvements on this invention and still be within the scope and spirit of this invention as set forth in the following claims.

What is claimed is:

1. A method of presulfiding a hydrotreating, hydrocracking or tail gas treating metal oxide catalyst comprising the steps of:
   (a) contacting said catalyst with an amount of powdered elemental sulfur in the range of from 1.5% by weight of the total catalyst more than stoichiometric to 1.5% by weight of the total catalyst less than stoichiometric, stoichiometric based upon the metal content of the catalyst, at a temperature below the melting point of sulfur such that said elemental sulfur sublimes and is substantially incorporated in the pores of said catalyst, thereby forming a mixture, and
   (b) heating said mixture in the presence of hydrogen to a temperature above the melting point of sulfur for a time period long enough for substantially all of the sulfur incorporated into the catalyst pores to have reacted to produce metal sulfides and hydrogen sulfides and to achieve a final sulfur level sufficient to sulfide active and promoter metals in said catalyst.

2. A method as in claim 1, wherein said catalyst is contacted with a stoichiometric amount of elemental sulfur based on the metal content of the catalyst.

3. A method as in claim 1, wherein said catalyst comprises at least one member selected from the group consisting of V, Cr, Mn, Fe, Co, Ni, Cu, Zn, Mo, W, Rh, Pd, Pt, Ag, Au, Cd, Sn, Sb, Bi and Te.

4. A method as in claim 3, wherein said catalyst comprises at least one member selected from the group consisting of Co, Mo, Ni and W.

5. A method of presulfiding a hydrotreating, hydrocracking or tail gas treating metal oxide catalyst comprising the steps of:
   (a) contacting said catalyst with an amount of powdered elemental sulfur in the range of from 1.5% by weight of the total catalyst more than stoichiometric to 1.5% by weight of the total catalyst less than stoichiometric, stoichiometric based upon the metal content of the catalyst, at a temperature below the melting point of sulfur such that said elemental sulfur sublimes and is substantially incorporated in the pores of said catalyst;
   (b) mixing said sulfur-incorporated catalyst with a prewetting agent comprising at least one member selected from the group consisting of hydrocarbon solvents and high boiling oils, thereby producing a prewet mixture, for a time period long enough such that in the presence of hydrogen substantially all of the sulfur incorporated into the catalyst pores can react to produce metal sulfides and hydrogen sulfides and achieve a final sulfur level sufficient to sulfide active and promoter metals in said catalyst.

6. A method as in claim 5, wherein said method further comprises the step of exposing said prewet mixture to hydrogen.

7. A method as in claim 5, wherein said prewetting agent further comprises at least one member selected from the group consisting of parafins and toluene.

8. A method as in claim 5, wherein said catalyst comprises at least one member selected from the group consisting of V, Cr, Mn, Fe, Co, Ni, Cu, Zn, Mo, W, Rh, Pd, Pt, Ag, Au, Cd, Sn, Sb, Bi and Te.

9. A method as in claim 8, wherein said catalyst comprises at least one member selected from the group consisting of Co, Mo, Ni and W.

10. A method as in claim 5, wherein said amount of sulfur is a stoichiometric amount.

11. A method of presulfiding a hydrotreating, hydrocracking or tail gas treating metal oxide catalyst comprising the steps of:
    (a) preparing a presulfiding suspension by mixing together powdered elemental sulfur and one or more members selected from the group consisting of high boiling oils and hydrocarbon solvents, so that a presulfiding suspension containing elemental sulfur results,
    (b) heating said suspension to a temperature below the melting point of sulfur, and
    (c) contacting a hydrotreating, hydrocracking or tail gas treating metal oxide catalyst with said suspension in a manner and for a time period long enough such that said elemental sulfur is substantially incorporated into the pores of said catalyst and for a time period long enough such that in the presence of hydrogen substantially all of the sulfur incorporated into the pores of said catalyst can react to produce metal sulfides and hydrogen sulfides and achieve a final sulfur level sufficient to sulfide active and promoter metals in said catalyst.

12. A method as in claim 11, wherein said method further comprises the step of exposing said catalyst contacted with said suspension to hydrogen.

13. A method as in claim 11, wherein said catalyst is contacted with a stoichiometric amount of elemental sulfur based upon the metal content of the catalyst, said amount being in the range of from about 1.5% by weight of the total catalyst more than stoichiometric to about 1.5% by weight of the total catalyst less than stoichiometric.

14. A method as in claim 11, wherein said amount of sulfur is a stoichiometric amount.

15. A method as in claim 11, wherein said suspension further comprises at least one member selected from the group consisting of parafins and toluene.

16. A method as in claim 11, wherein said catalyst comprises at least one member selected from the group consisting of V, Cr, Mn, Fe, Co, Ni, Cu, Zn, Mo, W, Rh, Pd, Pt, Ag, Au, Cd, Sn, Sb, Bi and Te.

17. A method as in claim 16, wherein said catalyst comprises at least one member selected from the group consisting of Co, Mo, Ni and W.

18. A method of presulfiding a hydrotreating, hydrocracking or tail gas treating metal oxide catalyst comprising the steps of:
    (a) preparing a presulfiding suspension by mixing together powdered elemental sulfur and at least one member selected from the group consisting of high boiling oils and hydrocarbon solvents, so that a presulfiding suspension containing elemental sulfur results, said sulfur being present in a stoichiometric amount based on the metal content of the catalyst,
(b) heating said suspension to a temperature below the melting point of sulfur, and
(c) contacting a hydrotreating, hydrocracking or tail gas treating metal oxide catalyst with said suspension in a manner and for a time period long enough such that said elemental sulfur is substantially incorporated into the pores of said catalyst and for a time period long enough such that in the presence of hydrogen substantially all of the sulfur incorporated into the pores of said catalyst can react to produce metal sulfides and hydrogen sulfides and achieve a final sulfur level sufficient to sulfide active and promoter metals in said catalyst.

19. A method of presulfiding a hydrotreating, hydrocracking or tail gas treating metal oxide catalyst comprising the steps of:
(a) preparing a presulfiding suspension by mixing together powdered elemental sulfur and two or more members selected from the group consisting of high boiling oils and hydrocarbon solvents, so that a presulfiding suspension containing elemental sulfur results,
(b) contacting a hydrotreating, hydrocracking or tail gas treating metal oxide catalyst with said suspension and subsequently heating at a temperature below the melting point of sulfur in a manner and for a time period long enough such that said elemental sulfur is substantially incorporated into the pores of said catalyst and for a time period long enough such that in the presence of hydrogen substantially all of the sulfur incorporated into the pores of said catalyst can react to produce metal sulfides and hydrogen sulfides and achieve a final sulfur level sufficient to sulfide active and promoter metals in said catalyst.

20. A mixture comprising a metal oxide catalyst and a suspension, wherein said suspension comprises:
an amount of elemental sulfur sufficient to sulfide active and promoter metals in said catalyst upon exposure to hydrogen, said sulfur being present in an amount in the range of from about 1.5% by weight of the total catalyst more than stoichiometric to about 1.5% by weight of the total catalyst less than stoichiometric, based upon the metal content of the catalyst; and
an amount of at least one of a hydrocarbon solvent and a high boiling oil which can be substantially incorporated into said catalyst.

21. A mixture as in claim 20, wherein said catalyst is a hydrotreating catalyst.

22. A mixture as in claim 20, wherein said catalyst is a hydrocracking catalyst.

23. A mixture as in claim 20, wherein said catalyst is a tail gas treating catalyst.

* * * * *